United States Patent [19]

Buecken et al.

[11] Patent Number: 4,759,962
[45] Date of Patent: Jul. 26, 1988

[54] ELASTOMERIC SEALING GASKET ASSEMBLY AND ITS METHOD OF MANUFACTURE

[75] Inventors: Hans-Juergen Buecken, Monheim; Hans-Ulrich Hempel, Langenfeld; Hans Pabel, Duesseldorf, all of Fed. Rep. of Germany

[73] Assignee: Henkel Kommanditgesellschaft auf Aktien, Duesseldorf, Fed. Rep. of Germany

[21] Appl. No.: 816,549

[22] Filed: Jan. 6, 1986

[51] Int. Cl.⁴ .......................... B32B 7/04; B32B 5/16; B32B 7/02; B05D 5/10
[52] U.S. Cl. .................................. 428/41; 427/208.4; 427/209; 427/369; 428/214; 428/215; 428/217; 428/323; 428/325; 428/327; 428/352; 428/355; 428/492; 428/521; 428/523; 428/914
[58] Field of Search .................... 428/41, 42, 325, 352, 428/492, 521, 355, 523, 214, 215, 217, 327, 323, 914; 427/208.4, 369, 209

[56] References Cited

U.S. PATENT DOCUMENTS 3,979,549 9/1976 Wilkinson .................. 428/483 X
4,223,067 9/1980 Lavens ........................... 428/406 X
4,409,290 10/1983 Wise ............................... 428/492 X
4,564,550 1/1986 Tschudin-Mahrer .............. 428/159

FOREIGN PATENT DOCUMENTS 2608257 9/1976 Fed. Rep. of Germany ...... 428/323
2747737 4/1978 Fed. Rep. of Germany ...... 428/323
3,407,995 9/1985 Fed. Rep. of Germany ...... 428/159
1541482 3/1979 United Kingdom ............... 428/323

OTHER PUBLICATIONS

Abstract of British 1,541,482, 3/1979, one page.
Abstract of German DE 2,747,737, 4/1978, Harvestor, one page.

Primary Examiner—Thomas J. Herbert
Attorney, Agent, or Firm—Ernest G. Szoke; Henry E. Millson, Jr.; Mark A. Greenfield

[57] ABSTRACT

An elastomeric sealing gasket assembly comprising a sealing compound layer between a removable carrier paper and a flexible cover film can be kept permanently elastic and, at the same time, withstand considerable surface pressure by embedding substantially imcompressible spacers in the sealing layer.

30 Claims, 1 Drawing Sheet

ELASTOMERIC SEALING GASKET ASSEMBLY AND ITS METHOD OF MANUFACTURE

BACKGROUND OF THE INVENTION

1. Field of the Invention

This invention relates to an elastomeric sealing gasket assembly. More particularly, the invention relates to a polymeric sealing laminate comprising a layer of sealing compound between a removable carrier paper and a flexible cover film. The invention also relates to a method for making the sealing gasket.

2. Description of Related Art

Seals or gaskets are commonly employed between two surfaces to be joined together when it is desired that the resulting joint be sealed thereby preventing corrosion and reducing noise emission. One form of sealing gasket commonly used in motor vehicles typically consists of a self-adhesive rubber layer on a carrier of silicone paper with a cover layer of thermoplastic film. Sealing gasket profiles tailored to the particular application may be punched or cut out from elongated sealing gasket strips of this kind. In practice, punched or cut sealing gasket strips or patches are introduced between two surfaces to be joined, for example between the frame and door hinge of a motor vehicle. This type of prior art sealing gasket, however, suffers from the major disadvantage of gradual loosening of the joint because the screws joining the two surfaces exert such pressure that the sealing compound is squeezed out of the joint sideways.

DESCRIPTION OF THE INVENTION

The object of the present invention is to provide a elastomeric sealing gasket assembly which satisfies the conflicting requirements of permanent elasticity and limited compressibility and which is, therefore, able to withstand the pressure of the joint surfaces without the sealing compound being squeezed out sideways, whereby the protected joint will not loosen to any substantial extent, even over long periods of use.

This and other objects of the invention which will be readily apparent to one skilled in the art are accomplished by a sealing gasket assembly which provides a permanently elastic seal of limited compressibility, said assembly comprising an elastomeric sealing layer, a flexible cover film disposed on one surface of said elastomeric sealing layer, and a removable carrier sheet disposed on the opposing surface of said elastomeric sealing layer, said elastomeric sealing layer containing therein substantially incompressible spacer materials. The invention also encompasses a method of making a sealing gasket assembly comprising the steps of (a) providing a removable carrier sheet having disposed on one surface thereof at least one elongated strip of an elastomeric sealing layer, said sealing layer having narrow zones defining cutting lines; (b) disposing in said sealing layer substantially incompressible spacer materials such that said narrow zones defining cutting lines are free from said spacer materials; and (c) disposing a flexible cover film on the upper surface of said sealing layer.

Figure 2:
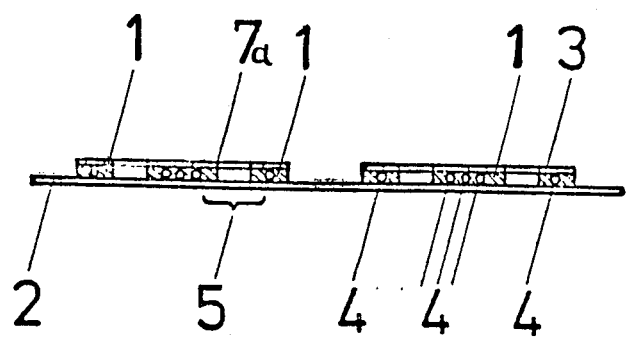
FIG. 2 is a cross-section through the assembly shown in FIG. 1.
Figure 1:
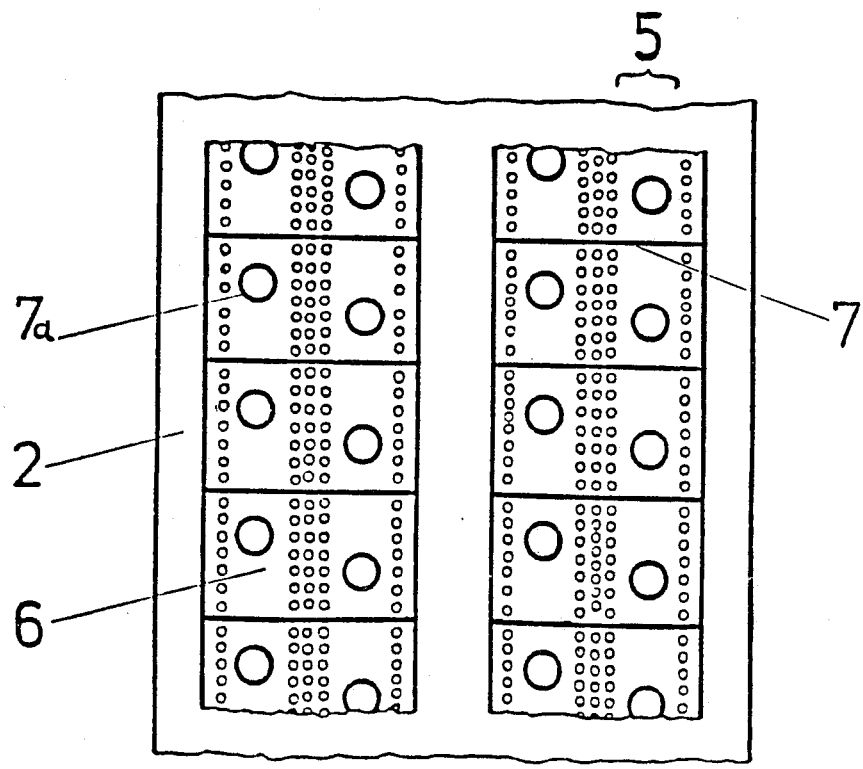
FIG. 1 is a plan view of a sealing gasket assembly of the present invention, showing two strips of gaskets on a carrier sheet.

As best seen in FIG. 2 which shows the preferred form of this invention, the sealing gasket assembly comprises three layers. The first layer is a removable carrier sheet 2, on which are disposed an intermediate elastomeric sealing layer 1, and a flexible cover film 3. Disposed within elastomeric layer 1 are the substantially incompressible spacer materials 4. In the preferred form of the invention illustrated in the Figures, a plurality of discrete subassemblies comprising layers 1 and 3 are carried on a single sheet of layer 2.

The elastomeric sealing layer 1 can be made from any elastomeric compound or mixture which retains its elasticity permanently. Vulcanizable or permanently plastic polymeric materials useful according to the process of this invention include natural rubber, butyl rubber, polyisobutylene, polychloroprene, styrene-butadiene rubber, polyvinyl chloride and mixtures thereof. Preferably the elastomeric compound is self-adhesive, i.e., is sufficiently tacky at the temperature of use that the layer will adhere, at least temporarily, to a surface to be joined. Sealing compounds of this type are well known in the art and may contain customary additives, e.g., plasticizers, stabilizers, pigments and the like. The thickness of the sealing layer can vary widely depending on the material employed and the nature of the joint to be sealed. In general thicknesses of from about 0.2 to 0.50 mm, preferably 0.4 to 0.20 mm can be satisfactorily employed. Most preferred, for automotive application, are thicknesses in the range of about 0.6 to 0.10 mm.

The releasable carrier sheet 2, can comprise any carrier web from which the above-described sealing layer may be easily stripped. Among the suitable materials are silicone paper, siliconized metal foils, plastic films and textile webs. Carrier sheet 2 can be of any thickness with sufficient strength to withstand the forces involved in making the laminate and delaminating the assembly during use, and is not otherwise limited.

As seen from the Figures, it is often preferable to use a releasable carrier sheet that is wider than the subassembly of layers 1 and 3 of the laminate. This construction facilitates removal of the sealing gaskets in order to apply them to the surfaces to be sealed. Also in the preferred embodiment illustrated in the Figures, a plurality of elongated subassemblies (strips) are carried on the releasable carrier sheet.

The flexible cover film 3, can be made of any material suitable to protect the elastomeric layer during handling and use. The cover film need only be flexible and able to withstand temperatures of typically 200° C. applied during stoving. Among the suitable materials are thermoplastic films, textile webs, and metal foils. Selection of preferred materials can be dictated largely by cost factors. Depending on the application, the cover film may be permanently or removably bonded to the surface of the elastomeric layer in a known manner.

The thickness of the cover film can vary widely depending on the material used and the end use of the gasket, and is not otherwise limited.

The present invention is able to avoid the problems of prior art sealing gaskets, in which the elastomeric sealing compound is squeezed out sideways from the joint, by employing substantially incompressible spacer materials 4 embedded in the elastomeric layer. In this fashion excess pressure forces are borne by the spacers and not by the elastomeric layer. The term "substantially incompressible" as used herein merely means that these materials will not be substantially compressed at the normal joining pressure employed in sealed joints.

The spacer materials can be formed from any inert substance that has the requisite incompressibility. In general, suitable materials include glass, metal (e.g., steel), ceramics, quartz, plastics or mixtures thereof. Preferred are spacers made from glass. The spacer materials may take a number of suitable forms in the practice of this invention. In the preferred embodiment the spacers are of relatively uniform thickness. The most preferred shape is spherical, although rounded forms such as ovoidsor ellipsoids can also be used. Thus a preferred system employs closely fractionated glass beads. Generally, any shape may be used that does not have sharp edges, corners, or projections likely to tear the sealing layer.

The thickness of the spacer material can vary widely and generally depends on the thickness of the elastomeric sealing layer in which it is disposed, the unevenness of the joined surfaces and the elasticity of the sealing compound. In general, the thickness of the spacer materials should be from about 0.25 to 0.8 preferably 0.5 to 0.75, most preferably 0.50 to 0.67 times the thickness of the sealing layer. As an example, a sealing layer of 0.8 mm thickness can be advantageously employed with a range of spacer material thicknesses (e.g., glass bead diameters) of between 0.4 and 0.6 mm.

The location of the spacer material 4 in the sealing layer 1 is also of importance in the preferred embodiment of the invention as shown in the Figures. In this illustrated form the sealing gasket assembly comprises a plurality of elongated strips or strands which are subjected to punching and/or cutting steps subsequent to the formation of the spacer-containing laminate. Typically, these strips may be cut into individual gaskets 6 and holes for fasteners may be punched therein. Elements 7 are the cutting lines for separating the individual gaskets and elements 7a are the cutting lines for the gasket holes.

Cutting or punching of the spacer-containing laminate can cause damage to the cutting or punching tools and to the surfaces adjoining of the seal joint to be protected by the sharp fragments of broken spacer materials. This problem is avoided in accordance with the present invention by locating the spacers in the sealing layer only in those areas which are not to be cut or punched during manufacture or use of the gasket assembly.

The spacers 4 are distributed in the elastomeric layer in such a way that narrow particle-free zones 5 remain free from spacers 4 along the cutting lines 7a. For example, spacers 4 may be applied to the sealing assembly in individual rows after production of the elastomeric layer/carrier sheet laminate, but before the cover film 3 is applied.

In one suitable method, the spacers 4, particularly beads, are fed from a hopper via a vibrating metering chute into a distributing unit. The function of this unit is to feed the same number of spacers to each row. The individual streams are then guided, via conduits, through funnels or vibrating chutes. The funnels or chutes are arranged over the underlying gasket assembly in such a way that the cutting lines 7 for subsequent cutting or punching remain substantially free from particles. After application of the cover film 3, the spacers 4 may be pressed into the sealing compound in the gap between a pair of rollers.

Alternatively, spacers adhering electrostatically or by adhesion forces may be applied to the tacky sealing compound by a roller. In a further embodiment, the spacers may be bonded to the cover film, after first providing lines of adhesive to the film. The cover film, together with the spacers bonded thereto in rows, may then be applied and rolled onto the sealed compound layer.

The invention is not limited to the linear disposition of spacers in rectangular gaskets as shown in the drawing. Any form of flat layered gasket may be formed according to the invention, including circular, free form, and irregular. However, in every instance, the spacers should be located a sufficient distance from the edge of the gasket and from any gasket holes or internal cut-outs, so that they are not extruded laterally from the gasket upon the application of pressure to the sealing layer or capable of moving laterally under such pressure a sufficient distance to tear the sealing layer.

We claim:

1. A substantially flat sealing gasket consisting essentially of: a permanently elastic elastomeric sealing layer; a flexible cover film disposed on one flat surface of said sealing layer; a removable carrier sheet disposed on the opposing flat surface of said sealing layer; and a plurality of substantially incompressible solid spacers of approximately equal size within said sealing layer sufficient to afford limited compressibility to said gasket said spacers being arranged in single unit thickness in uniform spacing parallel to the plane of said gasket.

2. The gasket of claim 1 wherein said cover film is a thermoplastic film.

3. The gasket of claim 1 wherein said carrier sheet is a silicone paper, siliconized metal foil, plastic film, textile webbing, or any mixture thereof.

4. The gasket of claim 1 wherein said carrier sheet is a silicone paper.

5. The gasket of claim 1 wherein said spacers do not have sharp edges, corners, or projections likely to tear said sealing layer.

6. The gasket of claim 1 wherein said spacers are of relatively uniform thickness and of rounded form.

7. The gasket of claim 1 wherein said spacers are spherical, ovoid, or ellipsoid.

8. The gasket of claim 1 wherein said spacers are spheres of relatively uniform size.

9. The gasket of claim 1 wherein said spacers are glass, metal, ceramic, quartz, or plastic.

10. The gasket of claim 1 wherein the thickness of said spacers is about 0.25 to 0.8 times the thickness of said sealing layer.

11. The gasket of claim 1 wherein said sealing layer is about 0.20 to 0.50 mm thick.

12. The gasket of claim 1 wherein said spacers are located a sufficient distance from the edge of said gasket and from any gasket holes or cut-outs, so that they are not extruded laterally from said gasket upon the application of pressure to said sealing layer and are not capable of moving laterally under such pressure a sufficient distance to tear said sealing layer.

13. The gasket of claim 1 wherein said sealing layer is natural rubber, butyl rubber, polyisobutylene, styrenebutadiene rubber, polychloroprene, polyvinylchloride, or any mixture thereof.

14. The gasket of claim 13 wherein said carrier sheet is a silicone paper, siliconized metal foil, plastic film, textile webbing, or any mixture thereof.

15. The gasket of claim 13 wherein said cover film is a plastic, textile webbing, metal foil, or any mixture thereof.

16. The gasket of claim 15 wherein said carrier sheet is a silicone paper, siliconized metal foil, plastic film, textile webbing, or any mixture thereof.

17. The gasket of claim 1 wherein said cover film is a plastic, textile webbing, metal foil, or any mixture thereof.

18. The gasket of claim 17 wherein siad carrier sheet is a silicone paper, siliconized metal foil, plastic film, textile webbing, or any mixture thereof.

19. The gasket of claim 1 wherein the thickness of said spacers is about 0.5 to 0.75 times the thickness of said sealing layer.

20. The gasket of claim 19 wherein said sealing layer is about 0.4 to 0.20 mm thick.

21. The gasket of claim 1 wherein the thickness of said spacers is about 0.50 to 0.67 times the thickness of said sealing layer.

22. The gasket of claim 21 wherein said sealing layer is about 0.60 to 0.10 mm thick.

23. The gasket of claim 1 wherein: said sealing layer is a vulcanizable plastic rubber mixture or a permanently plastic rubber mixture and is about 0.60 to 0.10 mm thick; said cover film is a thermoplastic film; said carrier sheet is a silicone paper; and said spacers are relatively uniform spheres of glass having a diameter of about 0.50 to 0.67 times the thickness of said sealing layer.

24. The gasket of claim 23 wherein said spacers are located a sufficient distance from the edge of said gasket and from any gasket holes or cut-outs, so that they are not extruded laterally from said gasket upon the application of pressure to said sealing layer and are not capable of moving laterally under such pressure a sufficient distance to tear said sealing layer.

25. An assembly of the gaskets according to claim 24, each said gasket being rectangular, said gaskets being arranged in at least one elongated strip wherein abutting gaskets are separated by a cutting line, and said assembly being located on a single carrier sheet.

26. The assembly of claim 25 wherein said spacers are arranged in a plurality of parallel rows running in the elongation direction of said strip.

27. The assembly of claim 26 wherein said rows are sufficiently separated to afford at least one elongated spacer-free zone in each said gasket and a cutting line for at least one gasket hole is provided in each said at least one elongated space-free zone.

28. A method for manufacturing the substantially flat sealing gasket of claim 1 comprising:
applying at least one elongated strip of said permanently elastic elastomeric sealing layer to said carrier sheet;
inserting a plurality of rows of spacers of relatively uniform size and of rounded form within each said strip running on the elongation direction of each said strip, said rows being sufficiently separated to afford at least one elongated spacer-free zone in each said gasket, each said row of spacers being interrupted periodically to afford a narrow space, said narrow spaces being aligned perpendicularly to said elongation direction so as to afford perpendicularly narrow spacer-free zones and said spacers being arranged in single unit thickness in uniform spacing parallel to the plane of said gasket;
attaching a flexible cover film on top of each of said strip and inserted spacers; and
forming a perpendicular cutting line through each narrow spacer-free zone and at least one cutting line for a gasket hole in each said elongated spacer-free zone between adjacent perpendicular cutting lines.

29. The method of claim 28 wherein said spacers are disposed within said sealing layer by:
depositing said spacers on the surface of each said strip;
covering each said strip and disposed spacers with a flexible cover film; and
pressing said spacers into each said sealing layer strip.

30. The method of claim 28 wherein said spacers are disposed within said sealing layer by:
providing a cover film with an electrostatically or chemically adhesive surface;
covering each said strip with said cover film and adhered spacers; and
pressing said spacers into each said sealing layer strip.

* * * * *